United States Patent
Ulrich et al.

(10) Patent No.: US 11,185,940 B2
(45) Date of Patent: Nov. 30, 2021

(54) SYSTEMS AND METHODS FOR CONTROLLING AN OUTPUT POWER OF A WELDING POWER SUPPLY

(71) Applicant: ILLINOIS TOOL WORKS INC., Glenview, IL (US)

(72) Inventors: James F. Ulrich, Appleton, WI (US); Jeremy D. Overesch, Neenah, WI (US); Edward G. Beistle, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/206,777

(22) Filed: Mar. 12, 2014

(65) Prior Publication Data
US 2015/0258621 A1 Sep. 17, 2015

(51) Int. Cl.
*B23K 9/10* (2006.01)
*B23K 9/18* (2006.01)

(52) U.S. Cl.
CPC .......... *B23K 9/1006* (2013.01); *B23K 9/1062* (2013.01); *B23K 9/186* (2013.01)

(58) Field of Classification Search
CPC .... B23K 9/1006; B23K 9/095; B23K 9/0953; B23K 9/1062; G01R 19/02
See application file for complete search history.

(56) References Cited

U.S. PATENT DOCUMENTS

| | | | |
|---|---|---|---|
| 3,984,654 A | 10/1976 | Hoffman | |
| 4,245,183 A * | 1/1981 | Glennon | G01R 19/02 322/28 |
| 4,897,522 A | 1/1990 | Bilczo | |
| 4,947,021 A | 8/1990 | Stava | |
| 5,615,095 A | 3/1997 | Reynolds | |
| 5,710,696 A | 1/1998 | Reynolds | |
| 5,824,990 A | 10/1998 | Geissler | |
| 6,115,273 A | 9/2000 | Geissler | |
| 6,124,581 A | 9/2000 | Ulrich | |
| 6,316,755 B1 | 11/2001 | Ulrich | |
| 6,329,636 B1 | 12/2001 | Geissler | |

(Continued)

FOREIGN PATENT DOCUMENTS

| | | |
|---|---|---|
| CN | 1256655 | 6/2000 |
| CN | 1333712 | 1/2002 |

(Continued)

OTHER PUBLICATIONS

Curve Fitting with Linear and Nonlinear Regression, Minitab Blog, Aug. 22, 2013.*

(Continued)

*Primary Examiner* — Erin E McGrath
(74) *Attorney, Agent, or Firm* — McAndrews, Held & Malloy, Ltd.

(57) ABSTRACT

A method for controlling an output current of a welding power supply includes detecting, using control circuitry of the welding power supply, a root mean square (RMS) current setting. The method also includes calculating, using the control circuitry, an average current command based on the RMS current setting. The method also includes controlling, using the control circuitry, the output current using the average current command to produce an output substantially the same as the RMS current setting.

17 Claims, 3 Drawing Sheets

(56) References Cited

U.S. PATENT DOCUMENTS

| | | |
|---|---|---|
| 6,347,025 B1 | 2/2002 | Ulrich |
| 6,441,342 B1 | 8/2002 | Hsu |
| 6,515,259 B1 | 2/2003 | Hsu |
| 6,683,286 B2 | 1/2004 | Ulrich |
| 6,707,001 B1 | 3/2004 | Ulrich |
| 6,730,875 B2 | 5/2004 | Hsu |
| 6,815,639 B2 | 11/2004 | Geissler |
| 6,930,279 B2 | 8/2005 | Myers |
| 6,940,039 B2 | 9/2005 | Blankenship |
| 7,064,290 B2 | 6/2006 | Blankenship |
| 7,091,445 B2 | 8/2006 | Myers |
| 7,573,002 B2 | 8/2009 | Myers |
| 7,683,290 B2 | 3/2010 | Daniel |
| 7,737,382 B2 | 6/2010 | Blankenship |
| 8,269,141 B2 | 9/2012 | Daniel |
| 8,354,827 B2 | 1/2013 | Werle |
| 8,410,398 B2 | 4/2013 | Daniel |
| 8,525,077 B2 | 9/2013 | Peters |
| 8,525,495 B2 | 9/2013 | Werle |
| 8,581,147 B2 | 11/2013 | Kooken |
| 8,680,431 B2 | 3/2014 | Stava |
| 8,742,280 B2 | 6/2014 | Vogel |
| 8,759,715 B2 | 6/2014 | Narayanan |
| 8,824,175 B2 | 9/2014 | Sickels |
| 8,829,869 B2 | 9/2014 | Kooken |
| 8,895,896 B2 | 11/2014 | ODonnell |
| 9,333,582 B2 | 5/2016 | Daniel |
| 2002/0103627 A1* | 8/2002 | Petrofsky ............... G01R 19/02 |
| | | 702/198 |
| 2005/0051524 A1 | 3/2005 | Blankenship |
| 2009/0184098 A1 | 7/2009 | Daniel |
| 2010/0230394 A1 | 9/2010 | Yokota |
| 2012/0146823 A1* | 6/2012 | Silva ..................... G01R 19/02 |
| | | 341/143 |
| 2014/0021182 A1 | 1/2014 | Peters |

FOREIGN PATENT DOCUMENTS

| | | |
|---|---|---|
| CN | 201098755 | 8/2008 |
| CN | 201846297 | 5/2011 |
| CN | 102596476 | 7/2012 |

OTHER PUBLICATIONS

International Search Report from PCT application No. PCT/US2014/070386, dated May 11, 2015, 9 pgs.

* cited by examiner

SYSTEMS AND METHODS FOR CONTROLLING AN OUTPUT POWER OF A WELDING POWER SUPPLY

BACKGROUND

The invention relates generally to welding systems, and, more particularly, to systems and methods for controlling an output power of a welding power supply.

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), and Gas Tungsten Arc Welding (GTAW)), typically employ a shielding gas (e.g., argon, carbon dioxide, or oxygen) to provide a particular local atmosphere in and around the welding arc and the weld pool during the welding process. In contrast, other welding techniques (e.g., submerged arc welding (SAW)) typically use a granular flux that decomposes or outgases under the arc conditions to provide the local atmosphere near the welding arc and weld pool. Additionally, SAW affords other advantages, such as increased deposition rates, compared to other welding techniques.

It may be desirable for certain welding systems to operate based on a root mean square (RMS) current setting and/or an RMS voltage setting. However, it may be difficult to regulate an RMS current based on the RMS current setting and/or an RMS voltage based on the RMS voltage setting. For example, regulating the RMS current and/or the RMS voltage may use a long term average (e.g., rectified average, absolute average, etc.) of an output welding voltage and/or an output welding current. Accordingly, such a welding system that operates using the RMS current and/or the RMS voltage may stabilize at the RMS current setting and/or the RMS voltage setting after a greater amount of time than desired.

BRIEF DESCRIPTION

In one embodiment, a method for controlling an output current of a welding power supply includes detecting, using control circuitry of the welding power supply, a root mean square (RMS) current setting. The method also includes calculating, using the control circuitry, an average current command based on the RMS current setting. The method also includes controlling, using the control circuitry, the output current using the average current command to produce an output substantially the same as the RMS current setting.

In another embodiment, a method for controlling an output voltage of a welding power supply includes detecting, using control circuitry of the welding power supply, a root mean square (RMS) voltage setting. The method also includes calculating, using the control circuitry, an average voltage command based on the RMS voltage setting. The method includes controlling, using the control circuitry, the output voltage using the average voltage command to produce an output substantially the same as the RMS voltage setting.

In another embodiment, an article of manufacture for controlling an output voltage of a welding power supply, an output current of the welding power supply, or some combination thereof, includes one or more tangible, non-transitory machine-readable media having encoded thereon processor-executable instructions. The instructions include instructions to detect a root mean square (RMS) voltage setting, to detect an RMS current setting, or some combination thereof. The instructions also include instructions to calculate an average voltage command based on the RMS voltage setting, to calculate an average current command based on the RMS current setting, or some combination thereof. The instructions include instructions to control the output voltage using the average voltage command, to control the output current using the average current command, or some combination thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
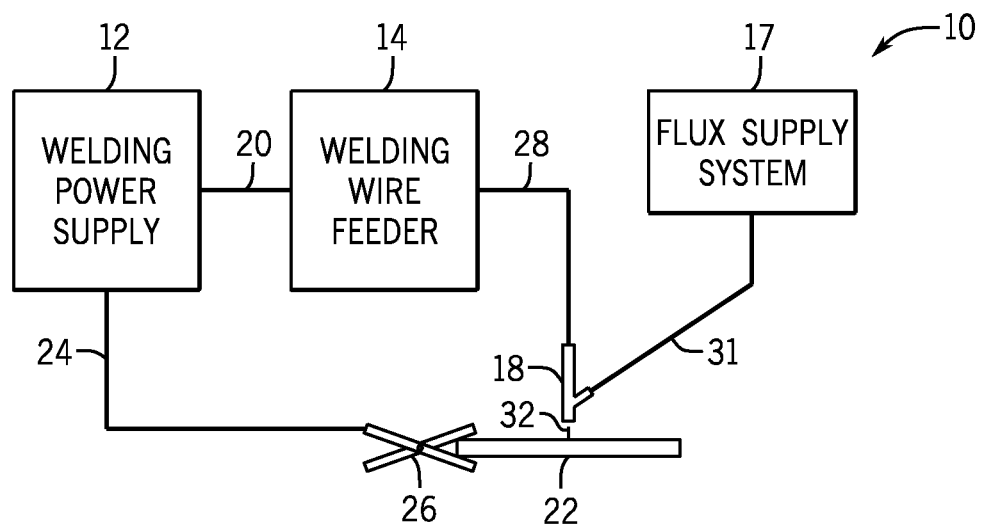
FIG. 1 is a block diagram of an embodiment of a submerged arc welding (SAW) system, in accordance with aspects of the present disclosure.

Turning to the figures, FIG. 1 illustrates an embodiment of a submerged arc welding (SAW) system 10 that may have an output controlled using a command that is calculated based on a root mean square (RMS) setting, in accordance with aspects of the present disclosure. The system 10 includes a welding power supply 12, a welding wire feed system 14, a flux supply system 17, and a welding torch 18. The welding power supply 12 generally supplies power to the welding system 10 and may be coupled to the welding wire feed system 14 via cable bundle 20 as well as coupled to a workpiece 22 using a lead cable 24 having a work connection clamp 26. In the illustrated embodiment, the welding wire feed system 14 is coupled to the welding torch 18 via a cable bundle 28 in order to supply welding wire (e.g., solid-core or flux-cored welding wire) and power to the welding torch 18 during operation of welding system 10. In another embodiment, the welding power supply 12 may couple and directly supply power to the welding torch 18.

The flux supply system 17 of the illustrated SAW system 10 provides flux to the welding torch 18 via a flux conduit 31. Accordingly, the illustrated welding torch 18 generally receives welding wire and power from the welding wire feed system 14 and a flow of flux from the flux supply system 17 in order to perform SAW of the workpiece 22. During operation, the welding torch 18 may be brought near the workpiece 22 so that an arc 32 may be formed between the welding torch 18 and the workpiece 22. It may be appreciated that the welding system 10 may control the delivery of power, welding wire, and/or flux to the torch 18, the arc 32, and/or the weld pool at the surface of the workpiece 22 to control the welding process.

Figure 2:
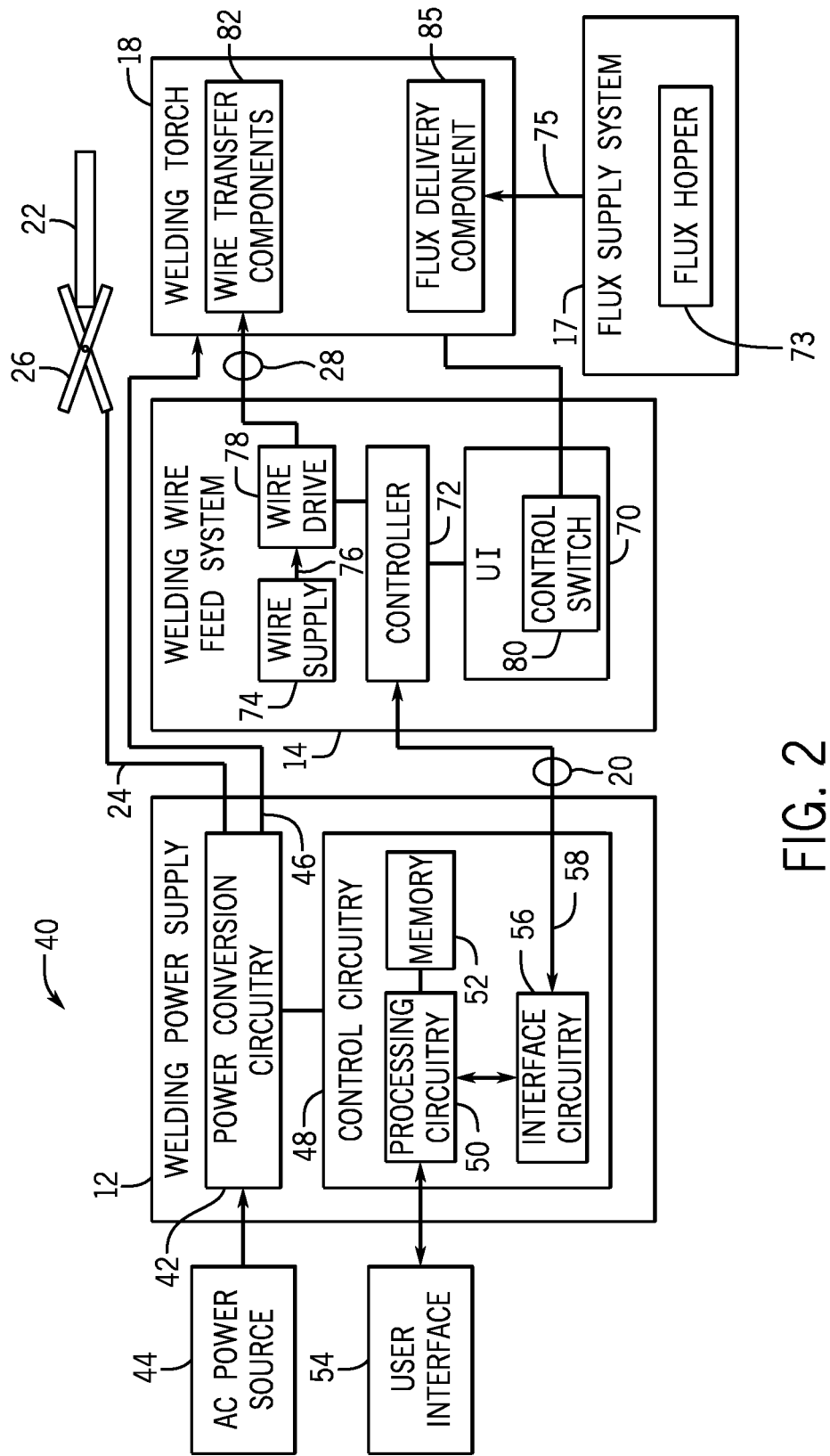
FIG. 2 is a block diagram of an embodiment of the internal circuitry of a SAW system, in accordance with aspects of the present disclosure.

In the embodiment illustrated in FIG. 2, the welding power supply 12 includes power conversion circuitry 42 that receives input power from an alternating current power source 44 (e.g., the AC power grid, an engine/generator set, or a combination thereof), conditions the input power, and provides output power via cable 46 to the welding torch 18, in accordance with demands of the system 40. Accordingly, in some embodiments, the power conversion circuitry 42 may include circuit elements (e.g., transformers, rectifiers, switches, and so forth) capable of converting the AC input power to a direct current electrode positive (DCEP) output, direct current electrode negative (DCEN) output, a variable balance AC output, and/or a single fixed balance AC output, as dictated by the demands of the system 40. The lead cable 24 terminating in the clamp 26 couples the power conversion circuitry 42 to the workpiece 22 and closes the circuit between the welding power supply 12, the workpiece 22, and the welding torch 18.

The weld power supply 12 also includes control circuitry 48 that is configured to receive and process a plurality of inputs regarding the performance and demands of the welding system 40. The control circuitry 48 includes processing circuitry 50 and memory 52. The memory 52 may include volatile or non-volatile memory, such as ROM, RAM, magnetic storage memory, optical storage memory, or a combination thereof. Furthermore, a variety of control parameters may be stored in the memory 52 along with code configured to provide a specific output (e.g., initiate wire feed, enable flux flow, detect RMS voltage and current settings, calculate voltage and/or current commands, control output voltage and/or output current, etc.) during operation. The processing circuitry 50 may also receive one or more inputs from a user interface 54, through which the user may choose a process and input desired parameters (e.g., voltages, currents, particular pulsed or non-pulsed welding regimes, and so forth). For example, in certain embodiments, the user interface 54 may enable the user to set parameters regarding the magnitude and amplitude of the electrode positive (EP) or electrode negative (EN) current (e.g., for welding application involving variable balance AC current and/or a single fixed balance AC output).

Based on such inputs received from the operator, the control circuitry 48 operates to control generation of welding power output that is applied to the welding wire for carrying out the desired welding operation, for example, via control signals transmitted to the power conversion circuitry 42. Based on such control commands, the power conversion circuitry 42 is adapted to create the output power that will ultimately be applied to the welding wire at the welding torch 18. To this end, as noted above, various power conversion circuits may be employed, including choppers, boost circuitry, buck circuitry, inverters, converters, and so forth. Still further, in the embodiment of FIG. 2, the control circuitry 48 also includes interface circuitry 56 configured to interface with the electronics of the welding wire feed system 14 during operation. The interface circuitry 56 is coupled to the processing circuitry 50 as well as to components of the welding wire feed system 14. Further, the processing circuitry 50 provides control signals associated with the weld operation to the welding wire feed system 14 via a cable 58 coupled to the interface circuitry 56. As before, the welding power supply 12 and the welding wire feed system 14 may be coupled to one another via the bundle 20 of cables, and the welding torch 18 may be coupled to the welding wire feed system 14 via the cable bundle 28.

As illustrated in FIG. 2, the welding wire feed system 14 also includes a user interface 70 that allows for system parameters (e.g., wire feed speeds, processes, selected currents, voltages or power levels, flux flow rates, and so forth) to be set on the welding wire feed system 14. As such, the user interface 70 is coupled to a controller 72, which allows for wire feed speeds to be controlled in accordance with operator selections, and permits these settings to be fed back to the power supply unit 12 via the interface circuitry 56. Furthermore, in certain embodiments, the controller 72 may couple to the flux supply system 17 such that the operation of the flux supply system 17 (e.g., a flux hopper 73) may be controlled via user settings entered from user interface 70. As illustrated, the user interface 70 may include a control switch 80.

The welding wire feed system 14 also includes components for feeding wire to the welding torch 18 and thereby to the welding application, under the control of the controller 72. For example, one or more wire supplies 74 (e.g., spools) of welding wire 76 are housed in the welding wire feed system 14. A wire feeder drive unit 78 may unspool welding wire 76 from the spools 74 and to progressively feed the welding wire 76 to the welding torch 18. To that end, the wire feeder drive unit 78 may include components such as circuitry, motors, rollers, and so forth, configured in a suitable way for establishing an appropriate wire feed. For example, in one embodiment, the wire feeder drive unit 78 may include a feed motor that engages with feed rollers to push wire from the welding wire feed system 14 towards the welding torch 18. Power from the welding power supply 12 is applied to the fed wire.

In the illustrated embodiment, the welding torch 18 may include wire transfer components 82 and a flux delivery component 85. In general, during welding system operation, the welding wire may be advanced through the cable bundle 28 towards the welding torch 18. Within the welding torch 18, additional wire transfer components 82, such as an additional pull motor and an associated drive roller, may be provided. The pull motor may be regulated to provide the desired wire feed speed. The control switch 80 may provide a signal to the controller 72 to allow the welding process to be started and stopped by the operator. These start/stop signals may be propagated from the controller 72 to the welding power supply 12. Accordingly, activating the control switch 80 may cause flux to be provided, the wire to advance, and power to be applied to the advancing welding wire.

Figure 3:
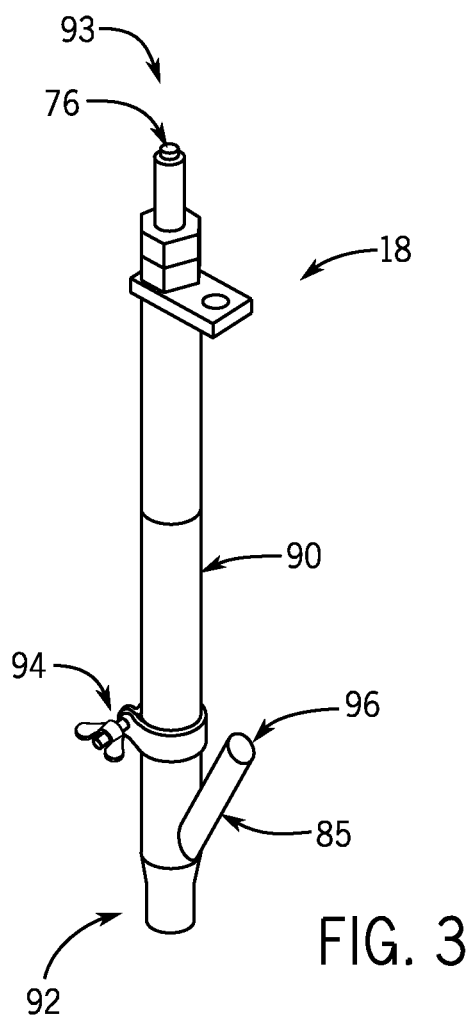
FIG. 3 is a perspective view of an embodiment of a SAW welding torch, in accordance with aspects of the present disclosure.

With the foregoing in mind, FIG. 3 is a perspective view of an embodiment of a submerged arc welding (SAW) torch 18 that is configured to provide welding wire, and flux to the surface of the workpiece 22. The illustrated SAW torch 18 includes a body 90 that encapsulates one or more passages through which the welding wire may traverse before exiting near a distal end 92 of the welding torch 18. That is, the welding wire 76 provided by the welding wire feed system 14 to the welding torch 18 may generally enter the torch from one end (e.g., proximal) portion 93 and may generally exit near a contact tip at the distal end 92 of the torch 18. Additionally, for the torch embodiment illustrated in FIG. 3, a flux delivery component 85 has been attached to the body 90 of the torch 18 via a clamping mechanism 94 such that the flux delivery component 85 surrounds the contact tip near the distal and 92 of the welding torch 18. In other embodiments, the flux delivery component 85 may be a conduit that affixes to the body 90 of the welding torch 18 that deposits flux near the weld arc without surrounding the contact tip. Furthermore, the illustrated flux delivery component 85 includes a conduit 96 that may couple to the conduit 75 in order to receive flux from the flux supply system 17.

Figure 4:
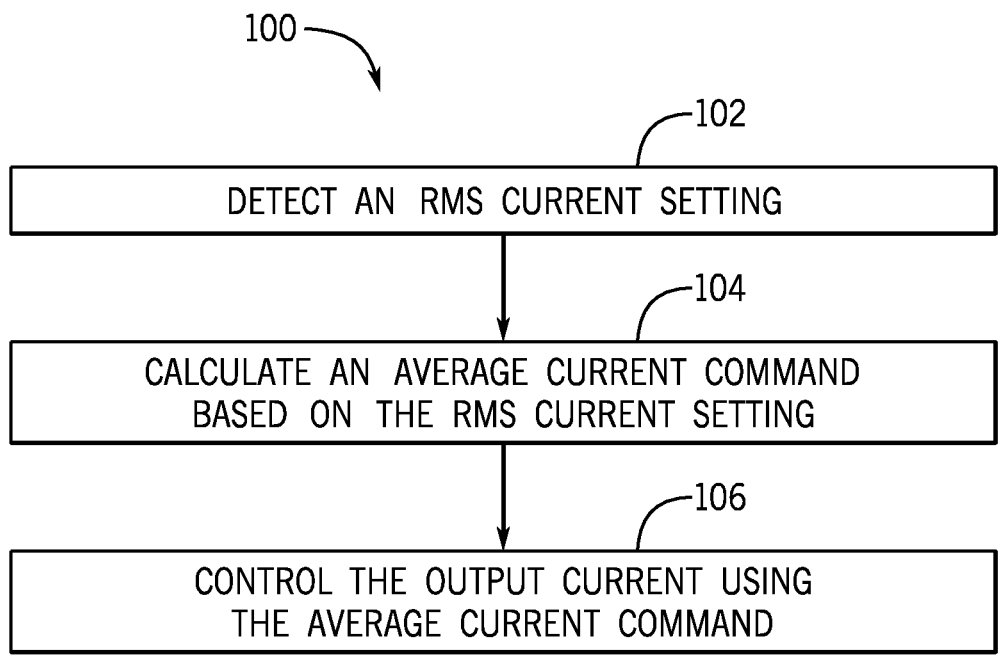
FIG. 4 is a flow chart of an embodiment of a method for controlling output current of a welding power supply, in accordance with aspects of the present disclosure.

FIG. 4 is a flow chart of an embodiment of a method 100 for controlling output current of the welding power supply 12. The method 100 includes detecting an RMS current setting using control circuitry 48 of the welding power supply 12 or control circuitry of another welding device (block 102). The method 100 also includes using the control circuitry 48 to calculate an average current command based on the RMS current setting (block 104). As may be appreciated, the average current may be a rectified average or an absolute average. The average current command may be calculated using any suitable technique, such as a technique based on an empirical estimate of the relationship between average and RMS values. In certain embodiments, the average current command may be calculated using the following formula: $i_{avg}=k_0+k_1*i_{rms}+k_2*i_{rms}^2$, where $i_{avg}$ is the average current command, $i_{rms}$ is the RMS current setting, $k_0$ is a first constant, $k_1$ is a second constant, and $k_2$ is a third constant. As may be appreciated, the first, second, and third constants may be suitable values. In other embodiments, a formula for calculating the average current command may be derived empirically by using a best fit curve for a particular waveform over a variety of conditions. The variety of conditions may include a desired RMS current, a wire speed, a desired RMS voltage, and so forth. In some embodiments, calculating the average current command may be accomplished using a lookup table instead of a formula. The lookup table may be based on empirical measurements or calculations from a simulation or understanding of the waveforms involved. The method 100 includes the control circuitry 48 controlling the output current using the average current command to produce an output substantially the same as the RMS current setting (block 106). In certain embodiments, controlling the output is accomplished using a feed forward control system.

Figure 5:
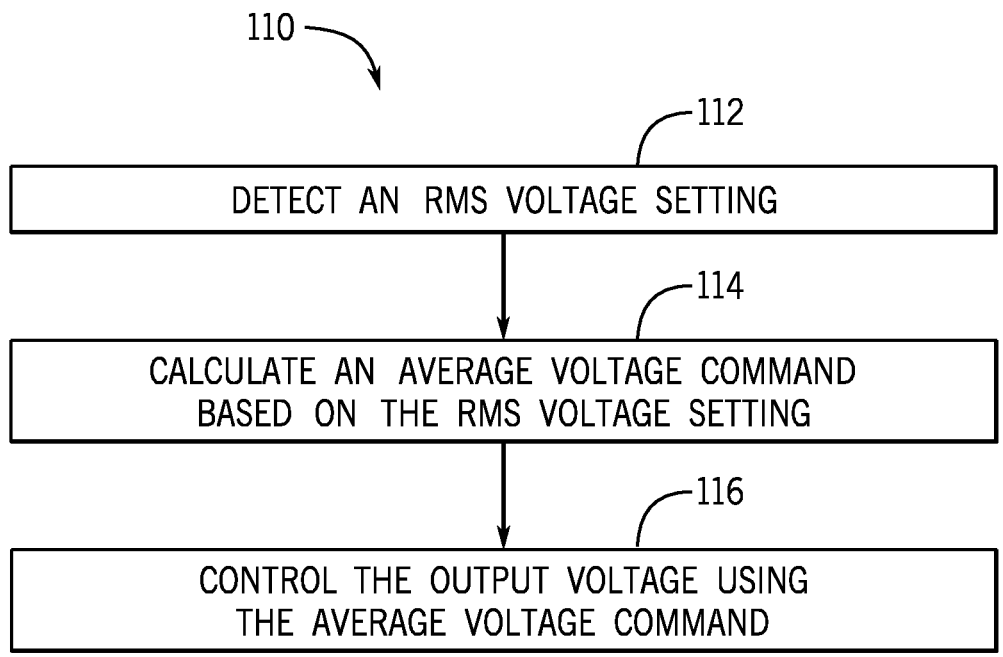
FIG. 5 is a flow chart of an embodiment of a method for controlling output voltage of a welding power supply, in accordance with aspects of the present disclosure.

FIG. 5 is a flow chart of an embodiment of a method 110 for controlling output voltage of the welding power supply 12. The method 110 includes detecting an RMS voltage setting using control circuitry 48 of the welding power supply 12 or control circuitry of another welding device (block 112). The method 110 also includes using the control circuitry 48 to calculate an average voltage command based on the RMS voltage setting (block 114). As may be appreciated, the average voltage may be a rectified average or an absolute average. The average voltage command may be calculated using any suitable technique, such as a technique based on an empirical estimate of the relationship between average and RMS values. In certain embodiments, the average voltage command may be calculated using the following formula: $v_{avg}=k_0+k_1*v_{rms}+k_2*v_{rms}^2$, where $v_{avg}$ is the average voltage command, $v_{rms}$ is the RMS voltage setting, $k_0$ is a first constant, $k_1$ is a second constant, and $k_2$ is a third constant. As may be appreciated, the first, second, and third constants may be any suitable values. For example, in certain embodiments, the first constant may be substantially equal to zero. As another example, in certain embodiments, the second constant may be greater than approximately 0.8, 0.9, and/or 0.97 (e.g., the second constant may be approximately 0.972217). As yet a further example, in certain embodiments, the third constant may be less than approximately 0.2, 0.1, and/or 0.001 (e.g., the third constant may be approximately 0.0006236). In other embodiments, a formula for calculating the average voltage command may be derived empirically by using a best fit curve for a particular waveform over a variety of conditions. The variety of conditions may include a desired RMS current, a wire speed, a desired RMS voltage, and so forth. In some embodiments, calculating the average voltage command may be accomplished using a lookup table instead of a formula. The lookup table may be based on empirical measurements or calculations from a simulation or understanding of the waveforms involved. The method 110 includes the control circuitry 48 controlling the output voltage using the average voltage command to produce an output substantially the same as the RMS voltage setting (block 116). In certain embodiments, controlling the output is accomplished using a feed forward control system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An article of manufacture for controlling an output voltage of a welding power supply, an output current of the welding power supply, or any combination thereof, based on a corresponding command level, comprising:
   one or more tangible, non-transitory machine-readable media having encoded thereon processor-executable instructions, the instructions comprising:
      instructions to detect at least one of (1) a setting of a root mean square (RMS) voltage via control circuitry of the welding power supply or via control circuitry of an at least one other welding device, or (2) a setting of an RMS current via the control circuitry of the welding power supply or via the control circuitry of the at least one other welding device, wherein the setting of the RMS voltage and the setting of the RMS current correspond to a desired RMS voltage output and a desired RMS current output, respectively, the settings received from one of a user interface or a memory storage;
      instructions to calculate at least one of (1) an average voltage command level using a formula in which an average voltage command level is based on a sum of a first non-zero constant times the setting of the RMS voltage and a second non-zero constant times the setting of the RMS voltage squared, or (2) an average current command level using a formula in which the average current command level is based on a sum of a third non-zero constant times the setting of the RMS current and a fourth non-zero constant times the RMS current squared, wherein the first constant, the second constant, the third constant and the fourth constant are each non-zero; and
      instructions to control the welding power supply to provide the output voltage at the calculated average voltage command level or control the welding power supply to provide the output current at the calculated average current command level.

2. The article of manufacture of claim 1, wherein the instructions calculate the average voltage command level using the following formula:
   $v_{avg}=k_0+k_1*v_{rms}+k_2*v_{rms}^2$, wherein $v_{avg}$ is the average voltage command level, $v_{rms}$ is the setting of the RMS voltage, $k_1$ is the first constant, $k_2$ is the second constant, and $k_0$ is a fifth constant.

3. The article of manufacture of claim 2, wherein the fifth constant is less than the second constant, the first constant is greater than 0.8, and the second constant is less than 0.2.

4. The article of manufacture of claim 2, wherein the fifth constant is less than the second constant, the first constant is greater than 0.97, and the second constant is less than 0.001.

5. The article of manufacture of claim 2, wherein the instructions to control the output voltage using the calculated average voltage command level comprise instructions to use a feed forward control system in which a signal indicating the RMS voltage is fed forward to control the output voltage.

6. The article of manufacture of claim 2, wherein the first constant is 0.972217, and wherein the second constant is 0.0006236.

7. The article of manufacture of claim 1, wherein the instructions calculate the average current command level using the following formula:
$i_{avg} = k_0 + k_1 * i_{rms} + k_2 * i_{rms}^2$, where $i_{avg}$ is the average current command level, $i_{rms}$ is the setting of the RMS current $k_1$ is the third constant, $k_2$ is the fourth constant, and $k_0$ is a fifth constant.

8. The article of manufacture of claim 7, wherein the instructions to control the output current using the calculated average current command level comprise instructions to use a feed forward control system in which a signal indicating the RMS current is fed forward to control the output current.

9. The article of manufacture of claim 7, wherein the third constant is greater than 0.8.

10. The article of manufacture of claim 7, wherein the third constant is greater than 0.97.

11. The article of manufacture of claim 7, wherein the fourth constant is less than 0.2.

12. The article of manufacture of claim 7, wherein the fourth constant is less than 0.001.

13. The article of manufacture of claim 1, wherein the instructions to calculate the average voltage command level based on the RMS comprise instructions to calculate the average voltage command level using a quadratic equation that relates the RMS voltage to the average voltage command level.

14. The article of manufacture of claim 1, wherein the average voltage command level comprises a rectified average voltage command level.

15. A welding power supply comprising:
control circuitry configured to:
  detect at least one of a setting of a root mean square (RMS) voltage waveform of the welding power supply to form a detected voltage waveform, or a setting of an RMS current waveform of the welding power supply to form a detected current waveform, wherein the setting of the RMS voltage and the setting of the RMS current correspond to a desired RMS voltage output and a desired RMS current output, the settings received from one of a user interface or a memory storage;
  calculate at least one of (1) an average voltage command level using a formula in which the average voltage command level is based on a sum of a first non-zero constant times the RMS value of the detected voltage waveform and a second non-zero constant times the RMS value of the detected voltage waveform squared or (2) an average current command level using a formula in which the average current command level is based on a sum of a third non-zero constant times the RMS value of the detected current waveform and a fourth non-zero constant times the RMS value of the detected current waveform squared, or both; and
  control (1) the welding power supply to provide an output voltage at the average voltage command level to produce the output voltage corresponding to the setting of the RMS voltage or (2) the welding power supply to provide an output current at the average current command level to produce the output current corresponding to the setting of the RMS current.

16. The welding power supply of claim 15, wherein the control circuitry is configured to calculate, via one or more tangible, non-transitory machine-readable media having encoded thereon processor-executable instructions, an average voltage command level using the following formula:
$v_{avg} = k_0 + k_1 * v_{rms} + k_2 * v_{rms}^2$, wherein $v_{avg}$ is the average voltage command level, $v_{rms}$ is the setting of an RMS value of the detected voltage waveform, $k_1$ is the first non-zero constant, and $k_2$ is the second non-zero constant, and $k_0$ is a fifth constant.

17. The welding power supply of claim 15, wherein the control circuitry is configured to calculate, via one or more tangible, non-transitory machine-readable media having encoded thereon processor-executable instructions, the average current command level using the following formula:
$i_{avg} = k_0 + k_1 * i_{rms} + k_2 * i_{rms}^2$, where $i_{avg}$ is the average current command level, $i_{rms}$ is the setting of the RMS current, $k_1$ is the third constant, and $k_2$ is the fourth constant, and $k_0$ is a fifth constant.

* * * * *